United States Patent
Ward et al.

(10) Patent No.: US 12,065,554 B2
(45) Date of Patent: Aug. 20, 2024

(54) CYANOACRYLATE COMPOSITIONS

(71) Applicants: Emer Ward, Dublin (IE); Raymond Tully, Dublin (IE); Barry Burns, Dublin (IE); Ralf Gossen, Düsseldorf (DE); Knut Hoffmann, Düsseldorf (DE); Juergen Lotz, Bopfingen (DE)

(72) Inventors: Emer Ward, Dublin (IE); Raymond Tully, Dublin (IE); Barry Burns, Dublin (IE); Ralf Gossen, Düsseldorf (DE); Knut Hoffmann, Düsseldorf (DE); Juergen Lotz, Bopfingen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 780 days.

(21) Appl. No.: 17/167,771

(22) Filed: Feb. 4, 2021

(65) Prior Publication Data

US 2021/0269622 A1    Sep. 2, 2021

Related U.S. Application Data

(63) Continuation of application No. PCT/EP2019/071980, filed on Aug. 15, 2019.

(30) Foreign Application Priority Data

Aug. 16, 2018 (GB) .................................. 1813411

(51) Int. Cl.
C08K 5/315 (2006.01)
C08K 5/1539 (2006.01)
C08L 27/06 (2006.01)
C08L 31/04 (2006.01)

(52) U.S. Cl.
CPC ............ *C08K 5/315* (2013.01); *C08K 5/1539* (2013.01); *C08L 27/06* (2013.01); *C08L 31/04* (2013.01)

(58) Field of Classification Search
CPC ....... C08K 5/315; C08K 5/1539; C08L 27/06; C08L 31/04; C08L 33/04; C08F 259/04; C08F 20/10; C08F 22/10; C08F 220/10; C08F 222/10; C09J 133/18; C09J 4/06; C09J 133/04
USPC ........................................................ 528/362
See application file for complete search history.

(56) References Cited

U.S. PATENT DOCUMENTS

| | | |
|---|---|---|
| 3,832,334 A | 8/1974 | O et al. |
| 4,196,271 A | 4/1980 | Kimura et al. |
| 4,440,910 A | 4/1984 | O'Connor |
| 4,444,933 A * | 4/1984 | Columbus ............... C09J 4/06 524/297 |
| 4,450,265 A | 5/1984 | Harris |
| 4,532,293 A | 7/1985 | Ikeda et al. |
| 4,556,700 A | 12/1985 | Harris et al. |
| 4,622,414 A | 11/1986 | Mckervey |
| 4,636,539 A | 1/1987 | Harris et al. |
| 4,695,615 A | 9/1987 | Leonard et al. |
| 4,718,966 A | 1/1988 | Harris et al. |
| 4,837,260 A | 6/1989 | Sato et al. |
| 4,855,461 A | 8/1989 | Harris et al. |
| 4,906,317 A | 3/1990 | Liu |
| 5,288,794 A | 2/1994 | Attarwala |
| 5,312,864 A | 5/1994 | Wenz et al. |
| 5,530,037 A | 6/1996 | Mcdonnell et al. |
| 6,607,632 B1 | 8/2003 | Mcdonnell et al. |
| 7,390,851 B1 * | 6/2008 | Misiak ................. C09J 127/06 525/193 |
| 11,015,088 B2 * | 5/2021 | Tully ..................... C09J 11/08 |
| 2008/0099136 A1 | 5/2008 | Krebs et al. |
| 2013/0186566 A1 | 7/2013 | Lotz et al. |
| 2020/0255692 A1 * | 8/2020 | Cobo .................. C08F 222/327 |

FOREIGN PATENT DOCUMENTS

| | | | | |
|---|---|---|---|---|
| CN | 105246872 | | 1/2016 | |
| CN | 105593283 | | 5/2016 | |
| GB | 2544272 | | 5/2017 | |
| JP | 2004230380 A | * | 8/2004 | |
| WO | 2010029134 | | 3/2010 | |
| WO | WO-2017077091 A1 | * | 5/2017 | ............. B32B 37/12 |
| WO | 2019081759 | | 5/2019 | |
| WO | WO-2019081759 A1 | * | 5/2019 | ............. C08F 22/32 |

OTHER PUBLICATIONS

International Search Report, PCT/EP2019/071980, mailed Jan. 2, 2020, pp. 1-3. (Year: 2020).*

G.H. Millet, "Cyanoacrylate Adhesives" in Structural Adhesives: Chemistry and Technology, S.R. Hartshorn, ed., Plenun Press, New York, p. 249-307 (1986).

H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).

PCT International Search Report issued in connection with International Application No. PCT/EP2019/071980 mailed Jan. 2, 2020.

* cited by examiner

*Primary Examiner* — Gregory Listvoyb (74) *Attorney, Agent, or Firm* — Steven C. Bauman (57) ABSTRACT

Cyanoacrylate-containing compositions that include, in addition to the cyanoacrylate component, an anhydride and a toughening agent comprising a co-polymer of polyvinyl chloride and polyvinyl acetate are provided.

19 Claims, 3 Drawing Sheets

CYANOACRYLATE COMPOSITIONS

BACKGROUND

Field

Cyanoacrylate-containing compositions that include, in addition to the cyanoacrylate component, an anhydride and a toughening agent comprising a co-polymer of polyvinyl chloride and polyvinyl acetate are provided.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in Handbook of Adhesives, 27, 463-77, I. Skeist, ed., Van Nostrand Reinhold, New York, 3rd ed. (1990). See also G. H. Millet, "Cyanoacrylate Adhesives" in Structural Adhesives: Chemistry and Technology, S. R. Hartshorn, ed., Plenun Press, New York, p. 249-307 (1986).

U.S. Pat. No. 4,440,910 pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

U.S. Pat. No. 5,288,794 (Attarwala) is directed to an improved cyanoacrylate monomer adhesive formulation, where an effective amount, for enhancing the thermal resistance of the polymerized adhesive, of a mono, poly or hetero aromatic compound characterized by at least three substitutions on an aromatic ring thereof, two or more of the substitutions being electron withdrawing groups, is provided. Examples of the aromatic compound are given as 2,4-dinitrofluorobenzene; 2,4-dinitrochlorobenzene; 2,4-difluoronitrobenzene; 3,5-dinitrobenzonitrile; 2-chloro-3,5-dinitrobenzonitrile; 4,4'-difluoro-3,3'-dinitrophenyl sulfone; pentafluoronitrobenzene; pentafluorobenzonitrile; $\alpha,\alpha,\alpha$-2-tetrafluoro-p-toluntrile and tetrachloroterphthalonitrile.

Prior to the discovery in the '794 patent, numerous attempts have been made to improve the thermal stability of cyanoacrylate adhesive bonds.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lapshears than in those of aluminium).

U.S. Pat. No. 4,532,293 is directed to the use of benzophenone tetracarboxylic acid or its anhydride and is said to provide a superior heat resistance for cyanoacrylate adhesives.

International Patent Application Publication No. WO 2010/029134 is directed to toughed cyanoacrylate compositions, which include a co-polymer of polyethylene and polyvinyl acetate.

U.S. Pat. No. 4,444,933 suggests the addition of a vinyl chloride/vinyl acetate copolymer, more specifically a vinyl chloride/vinyl acetate/maleic acid terpolymer and a plasticizer at a level of 25%, to a cyanoacrylate adhesive to reduce adhesion to human skin.

And in unrelated technology, U.S. Pat. No. 9,039,862 is directed to a hot-melt adhesive that can be used for the adhesive bonding of metal films or foils, paper films or foils, and/or plastic films or foils; the hot-melt adhesive is intended to exhibit good elasticity and high hardness. The hot-melt adhesive is intended to be applied onto the metal film or foil, paper film or foil, and/or plastic film or foil and to enable rapid bonding, so that immediate post-processing can be achieved. The hot-melt adhesive has a Shore D hardness above 50 and contains the following components 10 to 80 wt % of at least one thermomechanically degraded polypropylene copolymer, 5 to 60 wt % of at least one tackifying resin, 0 to 40 wt % of at least one further additive.

Figure 1A:
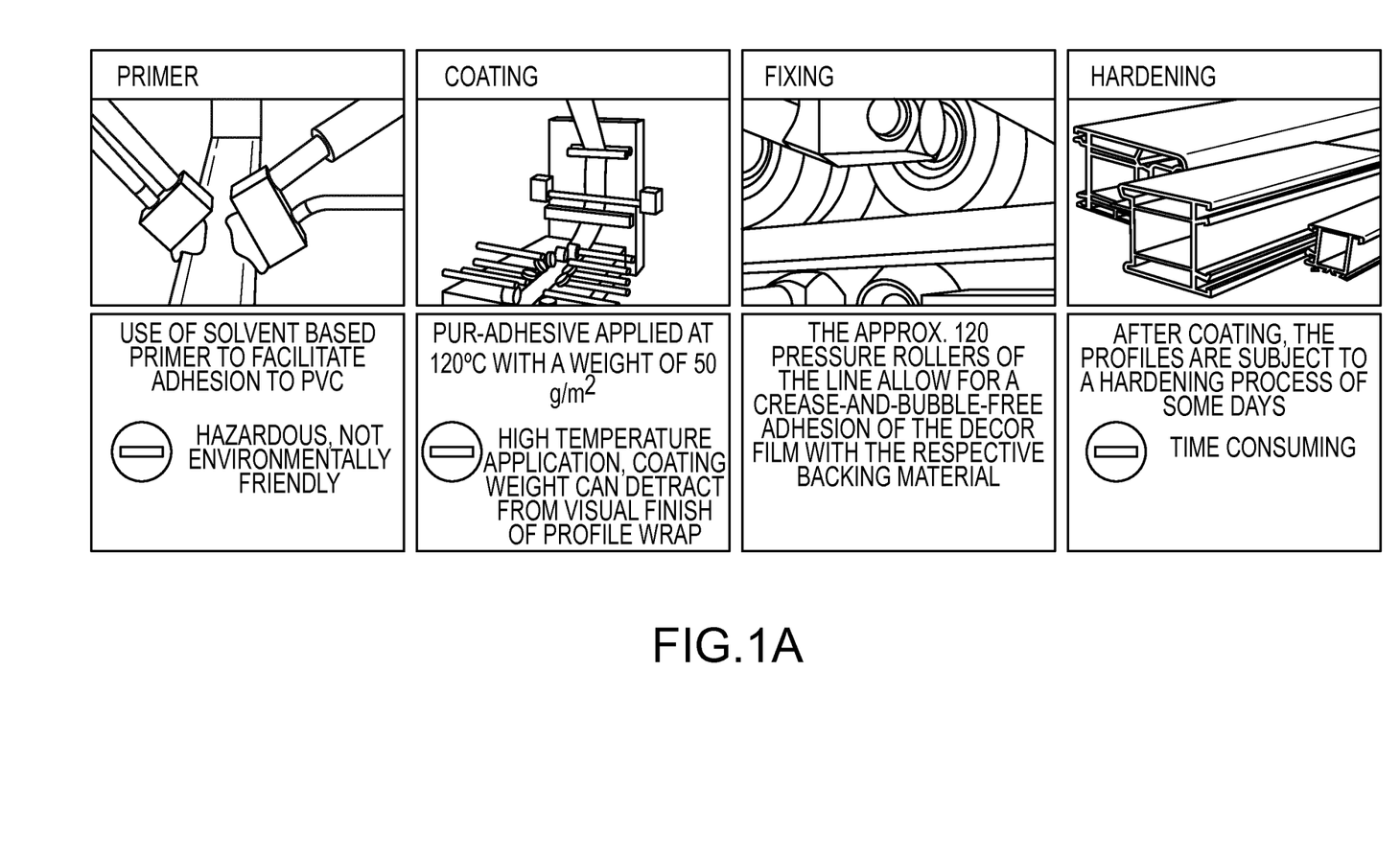
FIG. 1A depicts elements of the current method used for window profile wrapping, with a solvent-containing primer application step, prior to the use of a reactive polyurethane hot melt adhesive that is applied under elevated temperature and pressure conditions. Of the four stations highlighted, three of the four have a "-" designation, indicating that drawbacks exist with the station.
Figure 1B:
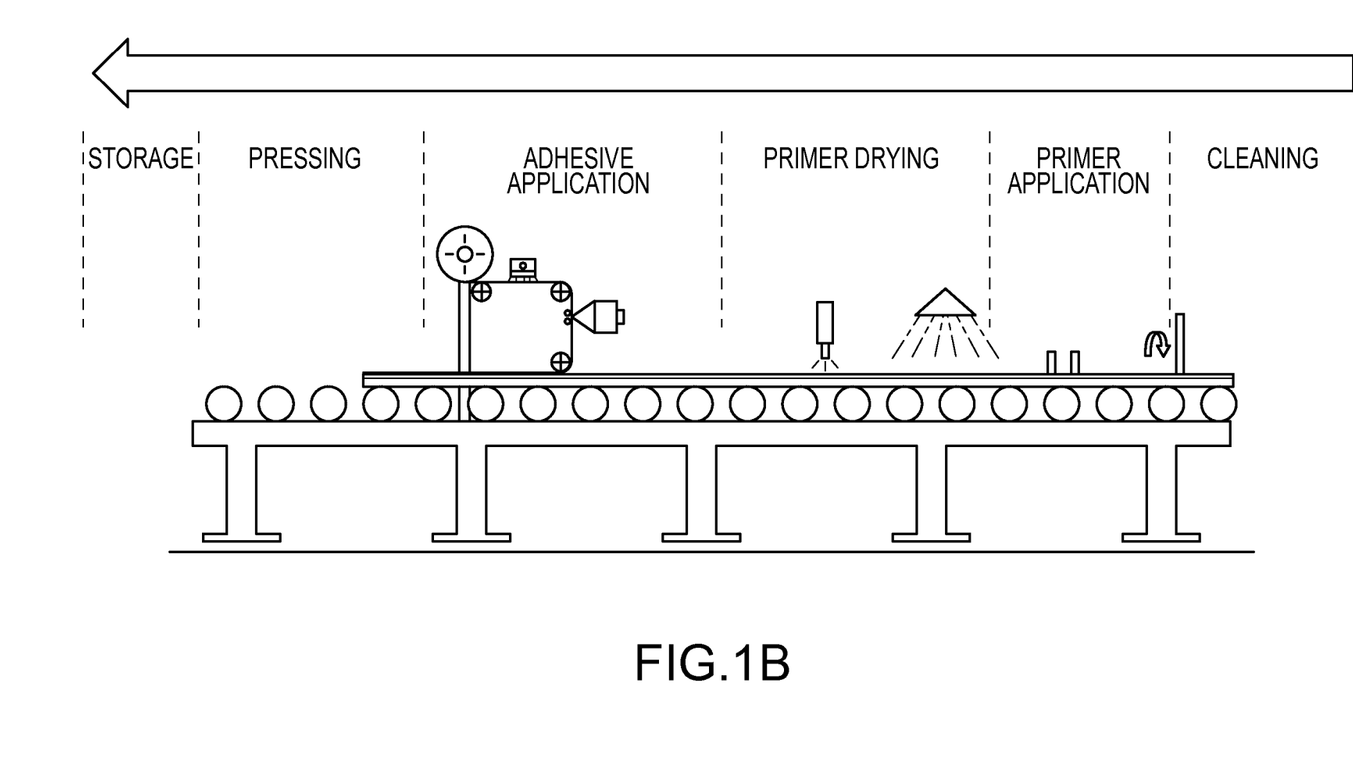
FIG. 1B depicts elements of the current method used for window profile wrapping, with the primer step of FIG. 1A shown as a (1) solvent-containing primer application step and (2) primer drying step, each prior to the use of a reactive polyurethane hot melt adhesive that is applied under elevated temperature and pressure conditions.

At present, hot-melt adhesives have been used in window profile wrapping applications, which may be conducted in a multi-step manufacturing process. (See FIGS. 1A and 1B.) In this process, a solvent-based primer is first applied to the PVC profile and then a drying step is required to evaporate the solvent. The PVC foil is then coated with a hot-melt adhesive made of polyurethane precursor components. The coating process occurs at a temperature of 120° C. and a coat weight of 50 g/m2. The adhesive-coated foil is then mated to the profile and the coated profile is then subjected to pressure using rollers to ensure bubble free adhesion and then left to cure at room temperature for some days. With reference to FIGS. 1A and 1B, it is seen that many of these steps carry impediments, whether environmental (e.g., organic solvent usage and increased energy requirements due in part to a drying step to evaporate the solvent and a heating step to warm the hot melt adhesive for flowability) or additional steps (e.g., a hardening step for the adhesive), which decreases throughput and requires the window to remain in storage until the adhesive sets (and thus takes up cost over head and floor/storage space).

The coated part must pass a standard established by the German Windows Association (RAL 716). This standard contains quality and test requirements for plastic window profiles made from high impact polyvinyl chloride that must be met by all profile designs. Technical appendix "Section I" to RAL-GZ 716; Quality and test requirements for window profiles made from PVC-U govern in Germany the manufacture and performance of such windows. The adhesion of the film to the window profile is referred to in Section 4-A1-2.17. There, the adhesion of the film is determined by a T-peel test (perpendicular to the surface of the profile) with substrate dimensions of 20 mm×100 mm and a pull speed of 10 mm/min in accordance with DIN 1372. According to this RAL standard, a peel value of >3 N/mm is required after RT aging while a value of >1.5 N/mm is required after 6 week aging at 70° C./98% RH.

While the present process for window profile wrapping applications is acceptable and performs well, improvements in throughput and energy efficiency would be welcome. For instance, several drawbacks are noteworthy. A multi-step process is time consuming; removing a step (e.g., a primer step) at a minimum makes the process more efficient. And the process involves the use of a solvent based primer, which carries environmental concerns as well as worker exposure concerns. The polyurethane hot-melt adhesive is applied at elevated temperature and a high coat weight, which has been observed to detract from the visual finish and aesthetics.

Thus, notwithstanding the state of the art (particularly with respect to window profile wrapping) and the efforts to date to improve the performance of cyanoacrylate compositions, there is a need to provide cyanoacrylate compositions with improved performance and a window profile wrapping process that addresses the desires in the marketplace. These needs and desires have not been met, let alone married, until now.

SUMMARY

Cyanoacrylate-containing compositions that include, in addition to the cyanoacrylate component, an anhydride and a toughening agent comprising a co-polymer of polyvinyl chloride and polyvinyl acetate are provided.

The inclusion of the anhydride and the toughening agent comprising a co-polymer of polyvinyl chloride and polyvinyl acetate noted above into the cyanoacrylate compositions, provides for improved properties, such as, as is described herein and shown in the Examples.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions.

The invention also provides a method of bonding a decorative laminate to a surface of an architectural window. The steps of this method include:
- providing an architectural window profile constructed from polyvinyl chloride, where the architectural window frame profile has a plurality of surfaces, many of which are visible to an observer of the window when installed, and wherein the plurality of surfaces visible to an observer when installed has disposed thereover a protective releasable film,
- removing the protective releasable film(s) from the appropriate surfaces of the architectural window profile,
- applying to the appropriate surfaces the inventive composition, and
- disposing over the composition-applied surface (s) a decorative strip of about the same dimension of the surface to which it is applied.

The invention will be more fully understood by a reading of the section entitled "Detailed Description", which follows.

DETAILED DESCRIPTION

As noted above, this invention is directed to a cyanoacrylate composition, which includes beyond the cyanoacrylate component, an anhydride and a toughening agent comprising a co-polymer of polyvinyl chloride and polyvinyl acetate.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 50% to about 99.98% by weight, with the range of about 75% to about 99% by weight being desirable, and about 80% by weight of the total composition being particularly desirable.

The toughening agent comprises an elastomeric co-polymer of polyvinyl chloride and polyvinyl acetate, commercially available examples of which include VINNOL® surface coating resins from Wacker Chemie AG, Germany. The resins are reported to adhere to a wide variety of substrates, especially to plastics and films with polar character. For instance, VINNOL H 40/60 is reported by the manufacturer as 61.0±1.0:39.0±1.0 vinyl chloride to vinyl acetate, with the following physical properties: K value of 60±1 (by EN ISO 1628-2); molecular weight of 100-140×10³ Mw by size exclusion chromatography (with THE as a solvent and polystyrene as a standard); viscosity of 180+30; particle size of <1; and a Tg of about 62 (by DSC).

The anhydride ordinarily should be an aromatic anhydride one or a hydrogenated aromatic one, like a hydrogenated phthalic anhydride, such as 3,4,5,6-tetrahydro phthalic anhydride. However, isomeric versions thereof and partially hydrogenated versions of phthalic anhydride may also be used.

The anhydride should be used in an amount up to about 2.5% by weight, such as within the range of about 0.01 to about 1%, desirably within the range of about 0.05 to about 0.9% by weight.

Desirably, when 3,4,5,6-tetrahydrophthalic anhydride is chosen, it should be used in an amount of up to about 0.9% by weight, such as about 0.05% to about 0.9% by weight.

In some embodiments, it may be desirable to include accelerators in the inventive cyanoacrylate compositions. However, they are not necessary and, in some instances, should be avoided. When they are chosen to be included, the accelerator should be chosen from calixarenes and oxacalixarenes, silacrowns, crown ethers, cyclodextrins, poly (ethyleneglycol) di (meth) acrylates, ethoxylated hydric compounds and combinations thereof.

Of the calixarenes and oxacalixarenes, many are known, and are reported in the patent literature. See e.g. U.S. Pat. Nos. 4,556,700, 4, 622, 414, 4, 636, 539, 4, 695, 615, 4, 718, 966, and 4, 855, 461, the disclosures of each of which are hereby expressly incorporated herein by reference.

For instance, as regards calixarenes, those within the following structure are useful herein:

where $R^1$ is alkyl, alkoxy, substituted alkyl or substituted alkoxy; $R^2$ is H or alkyl; and n is 4, 6 or 8.

One particularly desirable calixarene is tetrabutyl tetra [2-ethoxy-2-oxoethoxy] calix-4-arene.

A host of crown ethers are known. For instance, when the accelerator is chosen for use, any one or more of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1, 2-decalyl-15-crown-5, 1, 2-naphtho-15-crown-5, 3, 4, 5-naphtyl-16-crown-5, 1, 2-methyl-benzo-18-crown-6, 1, 2-methylbenzo-5, 6-methylbenzo-18-crown-6, 1, 2-t-butyl-18-crown-6, 1, 2-vinylbenzo-15-crown-5, 1, 2-vinylbenzo-18-crown-6, 1, 2-t-butyl-cyclohexyl-18-crown-6, asym-dibenzo-22-crown-6 and 1, 2-benzo-1, 4-benzo-5-oxygen-20-crown-7 may be used. See U.S. Pat. No. 4,837,260 (Sato), the disclosure of which is hereby expressly incorporated herein by reference. Of the silacrowns, again many are known, and are reported in the literature.

Specific examples of silacrown compounds useful in the inventive compositions include:

dimethylsila-11-crown-4;

dimethylsila-14-crown-5;

and dimethylsila-17-crown-6.

See e.g. U.S. Pat. No. 4,906,317 (Liu), the disclosure of which is hereby expressly incorporated herein by reference.

Many cyclodextrins may be used as well. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly (ethylene glycol) di (meth) acrylates suitable for use herein include those within the following structure:

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator should be included in the compositions in an amount within the range of from about 0.01% to about 10% by weight, with the range of about 0.1 to about 0.5% by weight being desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6, 607, 632, the disclosures of each of which are hereby incorporated herein by reference.

Other additives may be included in the inventive cyanoacrylate compositions, such as certain acidic materials (like citric acid), thixotropy or gelling agents, thickeners, dyes, thermal degradation resistance enhancers, and combinations thereof.

In another aspect of the invention, there is provided a method of bonding together two substrates, which method includes applying to at least one of the substrates a composition as described above, and thereafter mating together the substrates for a time sufficient to permit the adhesive to fixture.

In yet another aspect of the invention, there is provided reaction products of the so-described compositions.

In still another aspect of the invention, there is provided a method of preparing the so-described compositions. The method includes providing a cyanoacrylate component, and combining therewith with mixing a co-polymer of vinyl chloride and vinyl acetate.

And in still another aspect the invention also provides a method of bonding a decorative laminate to a surface of an architectural window. The steps of this method include:
  providing an architectural window profile constructed from polyvinyl chloride, where the architectural window frame profile has a plurality of surfaces, many of which are visible to an observer of the window, particularly when installed, and where some of the plurality of surfaces visible to an observer when installed may have disposed thereover a protective releasable film,
  if present, removing the protective releasable film (s) from the appropriate surfaces of the architectural window profile (sometimes to reveal a bare profile surface),
  applying to the appropriate surfaces the inventive composition, and
  disposing over the composition-applied surface (s) a decorative strip of about the same dimension of the surface to which it is applied.

In one case, the decorative strip should be constructed from a polyvinyl chloride material to which may be applied an outer layer constructed from an acrylic. Here, the outer layer provides added protection from scratches and dents. Of course, other configurations and constructions are also contemplated.

Figure 2:
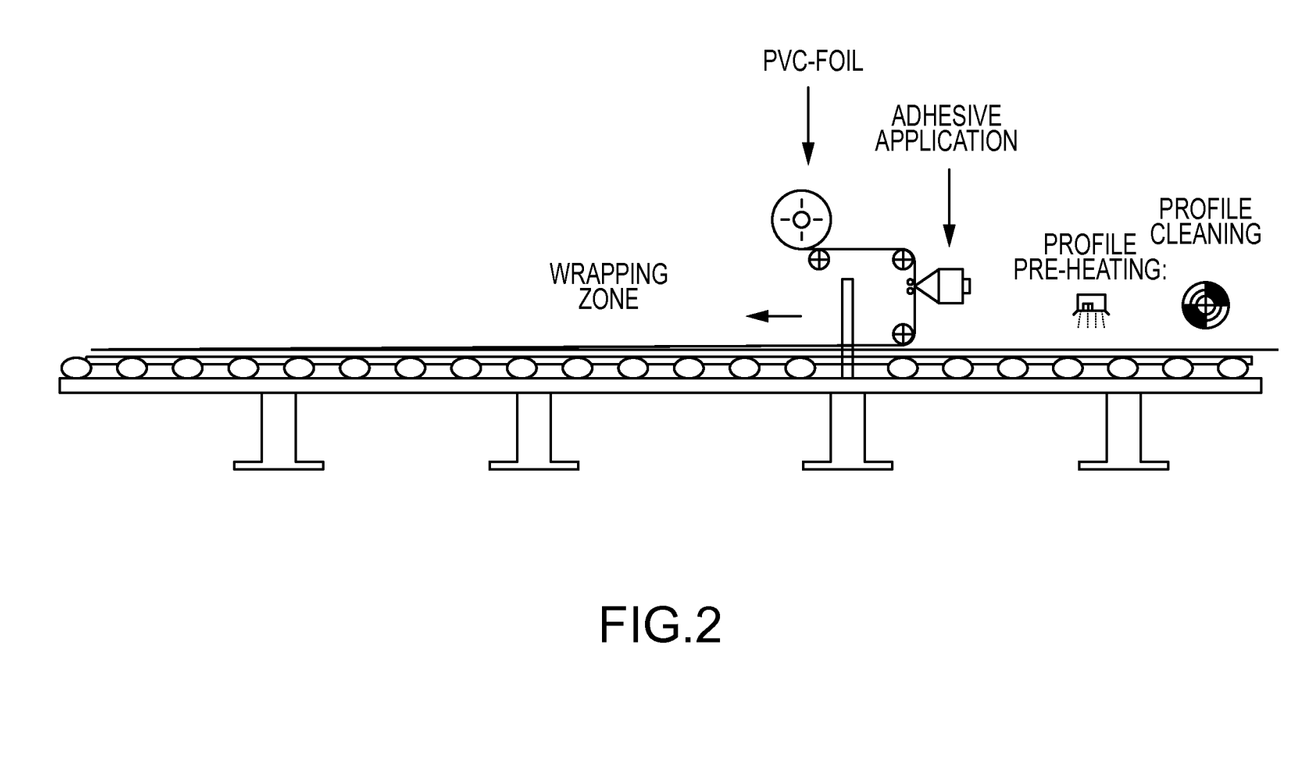
FIG. 2 depicts a schematic diagram showing four stations used in the method of the present invention.

With reference to the figures, the method may be considered in four stations. In the first station, bulk window profile is advanced along a manufacturing path. Also in the first station, bulk foil is advanced along a manufacturing path in the same general direction as the bulk window profile. Prior to becoming joined under pressure, the inventive cyanoacrylate composition in a second station is dispensed onto at least a portion of at least one of a surface of the profile and the foil to be joined. Once dispensed, in a third station the profile and the foil are mated under pressure applied from rollers with the inventive cyanoacrylate composition therebetween to bond together the profile and the foil to form an assembly. Finally, as the assembly advances into a fourth station, the assembly is cut in predetermined lengths to form a decorative architectural window.

In order to perform in a suitable manner, particularly in the method just described above, the inventive composition should have the following physical properties:
  Stability ratio of initial viscosity at 23° C. vs. viscosity at 82° ° C. after 72 hours: less than about 3.0, desirably about 2.0 or less
  Coat weight on foil: about 5 to about 40 gsm, such as about 10 to about 25 gsm, desirably about 10 to about 15 gsm
  T-Peel on PVC after 6 weeks at a temperature of at least 65° C./98% humidity: >=1.5 N/mm to substrate failure.

The composition may have further the following physical properties:
  T-Peel test at 23° C. at 24 hours: >=3 N/mm or to substrate failure
  T-Peel test at 23° ° C. at 72 hours: >=3 N/mm or to substrate failure
  T-Peel after storage at −10° C.: 3 N/mm or to substrate failure
  Long term PVC adhesion: T-peel test at 23° C. after 42 days storage in a climate conditioning cabinet set at 70° C./95% R. H: >=1.5 or to substrate failure In some embodiments, it may be desirable to exclude certain components, which are frequently used to adjust performance in cyanoacrylate compositions. Here, those components to be excluded are citric acid and/or a crown ether. For instance, the composition may exclude citric acid in an amount of 0.005 percent by weight and/or a crown ether in an amount of 0.2 percent by weight. It may be desirable to exclude citric acid and/or crown ether completely from the composition. It may be desirable to exclude citric acid and/or a crown ether as when citric acid and/or a crown ether are excluded from the composition a lower coat weight is achievable. It may also be desirable to exclude polymethylmethacrylate (PMMA) from the composition. Excluding PMMA in favor of polyvinyl chloride/polyvinyl acetate co-polymer allows for increased wetting of the composition onto the surface to be bonded and/or greater compatibility of the composition with the substrate to be bonded.

The composition may use the polyvinyl chloride/polyvinyl acetate co-polymer and the anhydride component are present in a by weight ratio of about 400:1 to about 10:1, such as about 40:1 to about 20:1.

The invention will be further illustrated by the examples which follow.

EXAMPLES

All formulations were prepared by mixing together the noted constituents for a sufficient period of time to ensure substantial homogeneity of the constituents. Ordinarily, about 2 hours at 65° C. should suffice, depending of course on the quantity of the constituents used.

Initially, a series of commercially available LOCTITE-branded cyanoacrylate adhesives were evaluated at a coat weight of 30 grams/square meter ("gsm" or "g/m2") on a polyvinyl chloride ("PVC") substrate mated to another PVC substrate. Here, the PVC substrates are a window profile and a foil (a decorative strip for attachment to one or more visible surfaces of the window profile). The profile and the foil are each supplied by different vendors: the profile is supplied by REHAU, Germany and the foil is supplied by Renolit, Munich, Germany under the trade name EXOFOL. The evaluation and results are recorded in Table 1 below.

TABLE 1

| Physical Property | LOCTITE-branded product | | | |
|---|---|---|---|---|
| | 401 | 406 | 460 | 435 |
| 96 hours @ RT (N/mm) | 1.7 | 1.8 | 0.9 | 1.8 |
| 7 days @ 70° C./98% RH (N/mm) | 2 | 1.5 | 0 | 1.7 |
| 28 days @ 70° C./98% RH (N/mm) | 0 | 0 | 0 | 1.4 |

After 42 days at a temperature of 70° ° C. and 98% relative humidity, no adhesion for any of the four products was measured on the PVC substrates. Nonetheless, LOCTITE 435 appeared to be the most promising of the four. Thus, we used it in comparison with other formulation samples.

Next, a variety of elastomers were evaluated in ethyl cyanoacrylate compositions together with three different anhydrides, results of which are set forth below in Table 2.

TABLE 2

| Constituents | Sample No./Amt (wt %) | | | | | |
|---|---|---|---|---|---|---|
| | 5 | 6 | 7 | 8 | 9 | 10 |
| Ethyl cyanoacrylate | 87.8 | 86.8 | 86.8 | 86.8 | 79.8 | 79.8 |
| Stabilizer package | 0.26 | 0.26 | 0.26 | 0.26 | 0.26 | 0.26 |
| Citric Acid | 0.005 | 0.005 | 0.005 | 0.005 | 0.005 | 0.005 |
| VAMAC VCS 5500 | 12.0 | 12.0 | 12.0 | 12.0 | — | — |
| Dibenzo-18-Crown-6-ether | 0.2 | 0.2 | 0.2 | 0.2 | 0.2 | 0.2 |
| 3,4,5,6-Tetrahydrophthalic Anhydride | — | 1.0 | — | — | — | — |
| Itaconic anhydride | — | — | 1.0 | — | — | — |
| Phthalic anhydride | — | — | — | 1.0 | — | — |
| VINNOL 40/60 | — | — | — | — | 20.0 | — |
| LEVAMELT 900 | — | — | — | — | — | 20.0 |

LOCTITE 435 and Sample Nos. 5-10 were evaluated for stability and T-peel strength performance. After 24 hours at room temperature, LOCTITE 435 showed good stability and after three days at a temperature of 82° C., LOCTITE 435 showed a viscosity ratio of 1.1. The viscosity ratio was measured as the three day value divided by the initial viscosity value at room temperature.

Each of Sample Nos. 5-10 showed good stability after 24 hours at room temperature. And all but Sample No. 9 gelled after the three day more aggressive evaluation. Sample No. 9 on the other hand showed a viscosity ratio of 2.7. While better than each of Sample Nos. 5-8 and 10, Sample No. 9 still showed poorer stability by a factor of more than 2.

From a performance standpoint, each of these samples once cured and allowed to condition for one week at room temperature showed substrate failure. After 42 days at a temperature of 70° ° C. and 98% relative humidity, all but Sample No. 10 exhibited substrate failure; Sample No. 10 exhibited no T-peel strength.

Next, formulations were prepared with VAMAC VSC 5500 as an elastomer and then various levels of VINNOL 40/60 as an elastomer. An anhydride component was also included in some of the samples. Tables 3A and 3B show the constituents of Sample Nos. 11-21.

TABLE 3A

| Constituents | Sample No./Amt (wt %) | | | | | |
|---|---|---|---|---|---|---|
| | 11 | 12 | 13 | 14 | 15 | 16 |
| Ethyl cyanoacrylate | 87.29 | 74.79 | 74.29 | 79.29 | 84.29 | 89.29 |
| Stabilizer package | 0.002 | 0.0005 | 0.0005 | 0.0005 | 0.0005 | 0.0005 |
| Citric Acid | 0.005 | 0.005 | 0.005 | 0.005 | 0.005 | 0.005 |
| VINNOL 40/60 | — | 25.0 | 25.0 | 20.0 | 15.0 | 10.0 |
| VAMAC VCS 5500 | 12.0 | — | — | — | — | — |
| Dibenzo-18-Crown-6-ether | 0.2 | 0.2 | 0.2 | 0.2 | 0.2 | 0.2 |
| 3,4,5,6-Tetrahydrophthalic anhydride | 0.5 | — | 0.5 | 0.5 | 0.5 | 0.5 |

TABLE 3B

| Constituents | Sample No./Amt (wt %) | | | | |
|---|---|---|---|---|---|
| | 17 | 18 | 19 | 20 | 21 |
| Ethyl cyanoacrylate | 79.70 | 79.70 | 78.89 | 79.50 | 79.10 |
| Stabilizer package | — | — | — | — | — |
| Citric Acid | 0.005 | 0.005 | 0.005 | 0.005 | 0.005 |
| VINNOL 40/60 | 20.0 | 20.0 | 20.0 | 20.0 | 20.0 |
| Dibenzo-18-Crown-6-ether | 0.2 | 0.2 | 0.2 | — | — |
| 3,4,5,6-Tetrahydrophthalic anhydride | 0.5 | 0.09 | 0.9 | 0.5 | 0.9 |

For Sample Nos. 11-21, viscosity ratio measurements were made after three day at a temperature of 82° C.; the coat weights were recorded; and T-peel strength were made after 42 days at a temperature of 65° C. and 95% relative humidity. These data are set below in Tables 4A and 4B, where SF is substrate failure and PF is partial substrate failure.

TABLE 4A

| Physical Properties | Sample Nos. | | | | | |
|---|---|---|---|---|---|---|
| | 11 | 12 | 13 | 14 | 15 | 16 |
| 3 Days @ 82° C. Viscosity Ratio | 1.1 | Gelled | Gelled | 3.0 | 2.5 | 1.9 |
| Coat Wt (gsm) | 29.7 | 30.5 | 25.1 | 25.3 | 20.1 | 27.0 |
| T-peel 42 Days @ 65° C./95% RH (psi) | SF | 0 | SF | SF | PF | PF |

TABLE 4B

| Physical Properties | Sample Nos. | | | | |
|---|---|---|---|---|---|
| | 17 | 18 | 19 | 20 | 21 |
| 3 Days @ 82° C. Viscosity Ratio | 1.6 | 1.4 | 1.6 | 1.7 | 1.7 |
| Coat Wt (gsm) | 25.5 | 29.2 | 18.8 | 16.5 | 10.4 |

TABLE 4B-continued

| Physical Properties | Sample Nos. | | | | |
|---|---|---|---|---|---|
| | 17 | 18 | 19 | 20 | 21 |
| T-peel 42 Days @ 65° C./95% RH (psi) | SF | 0 | SF | SF | PF |

An anhydride, specifically 3,4,5,6-tetrahydrophthalic anhydride (THPA), in the presence of VINNOL 40/60 showed promising results. Surprisingly, the cyanoacrylate composition with both anhydride and VINNOL 40/60, when applied to PVC substrates to form a bonded assembly, substrate failure was observed after 3 weeks of conditioning at a temperature of 65° C. and a relative humidity of 95%. In contrast, without the presence of anhydride, not only was substrate failure not observed, but no T-peel strength at all was demonstrated. These observations are recorded below in Table 5 in ethyl cyanoacrylate composition to which the constituents in the leftmost column were added and the respective coat weights listed in the middle column.

TABLE 5

| | Wt (g/m2) | 6 wks 65° C./95% RH |
|---|---|---|
| 10% Vinnol | 24.6 | 0 |
| 15% vinnol | 27.3 | 0 |
| 20% vinnol | 21.5 | 0 |
| 25% vinnol | 30.5 | 0 |
| 10% Vinnol + THPA | 27.0 | SF |
| 15% vinnol + THPA | 20.1 | SF |
| 20% vinnol + THPA | 25.3 | SF |
| 25% vinnol + THPA | 25.1 | SF |

In Table 6A, Sample Nos. 17-21 are shown with the various constituents and relative amounts presented. Each of the samples shown in Table 6A contain 20 percent by weight VINNOL 40/60 and a hydrogenated aromatic anhydride (here, 3, 4, 5, 6-tetrahydrophthalic anhydride in an amount ranging from 0.09 to 0.9 percent by weight. Three of the samples also contained citric acid and a crown ether, whereas the other two did not.

TABLE 6A

| Constituents | Sample Nos./Amt (wt %) | | | | |
|---|---|---|---|---|---|
| | 17 | 18 | 19 | 20 | 21 |
| Ethyl cyanoacrylate | 79.70 | 79.70 | 78.89 | 79.50 | 79.10 |
| Stabilizer package | 0.0015 | 0.0015 | 0.0015 | 0.0015 | 0.0015 |
| Citric Acid | 0.005 | 0.005 | 0.005 | — | — |
| VINNOL 40/60 | 20.0 | 20.0 | 20.0 | 20.0 | 20.0 |
| Dibenzo-18-Crown-6-ether | 0.2 | 0.2 | 0.2 | — | — |
| 3,4,5,6-Tetrahydrophthalic Anhydride | 0.5 | 0.09 | 0.9 | 0.5 | 0.9 |

In Table 6B, various coat weights of Sample Nos. 17-21 were disposed on a surface of a PVC substrate to which was bonded the PVC foil to form a bonded PVC assembly. The bonded PVC assemblies were evaluated for T-peel strength performance (measured in N/mm) after conditioning for 6 weeks (or 42 days) at a temperature of 65° C. and 95% relative humidity.

TABLE 6B

| | Sample Nos. | | | | |
|---|---|---|---|---|---|
| | 17 | 18 | 19 | 20 | 21 |
| Coat Weight (gsm) | 13.0 | 16.5 | 13.6 | 16.5 | 7.9 |
| 6 weeks @ 65° C./95% RH-T-peel | 0.1 | 0 | 0 | SF | 0.3 |
| Coat Weight (gsm) | 15.5 | 18.5 | 15.3 | 18.2 | 9.9 |
| 6 weeks @ 65° C./95% RH-T-peel | 0.4 | 0 | PF | SF | PF |
| Coat Weight (gsm) | 20.7 | 23.0 | 16.8 | 19.0 | 10.4 |
| 6 weeks @ 65° C./95% RH-T-peel | 0.5 | 0 | PF | SF | SF |
| Coat Weight (gsm) | 25.5 | 26.6 | 18.8 | 22.6 | 14.0 |
| 6 weeks @ 65° C./95% RH-T-peel | SF | 0 | SF | SF | SF |
| Coat Weight (gsm) | 27.0 | 29.2 | — | 25.9 | 20.6 |
| 6 weeks @ 65° C./95% RH-T-peel | SF | 0 | — | SF | SF |

The lowest coat weights evaluated were for Sample No. 21, which at just below 8 gsm showed a modest T-peel strength of 0.3 N/mm. However, when the coat weight was increased to just below 10 gsm (9.9 gsm), a substrate failure (albeit partial) was observed. When the coat weight was increased to slightly above 10 gsm (10.4 gsm), substrate failure was observed. Substrate failure was not observed at such a low coat weight of the other sample evaluated. The next lowest coat weight was observed with Sample Nos. 19 and 20 where coat weights in the 15 gsm and 16 gsm vicinity were applied to the PVC substrate.

In addition, it appeared that the level of anhydride influences that coat weight required to give greater T-peel strength (such as above 1.5 psi) or even substrate failure, even after only 3 weeks aging at a temperature of 65° C. and a relative humidity of 95. With increasing levels of anhydride, the coat weight to give rise to substrate failure was significantly reduced. In Table 7 below, this trend may be observed.

TABLE 7

| Formulation | Level of Anhydride | Coat weight(g/m2) and conditions |
|---|---|---|
| 18 | 0.09% | 35.0 (3 wks 65/95% RH) |
| 17 | 0.50% | 25.5 (6 wks 65/95% RH) |
| 19 | 0.90% | 18.8 (6 wks 65/95% RH) |

What is claimed is:

1. A cyanoacrylate composition, comprising:
    (a) a cyanoacrylate component,
    (b) an anhydride component present in an amount of about 0.05 to about 1.5 percent by weight, wherein the anhydride component is 3,4,5,6-tetrahydrophthalic anhydride, and
    (c) a polyvinyl chloride/polyvinyl acetate co-polymer;
    wherein the polyvinyl chloride/polyvinyl acetate co-polymer is made from a ratio of vinyl chloride units to vinyl acetate units of about 61:39 and is present in an amount of about 10 percent by weight to about 25 percent by weight;
    wherein the anhydride component is present in an amount of about 0.05 to about 1.5 percent by weight;
    wherein the polyvinyl chloride/polyvinyl acetate co-polymer and the anhydride component are present in a by weight ratio of about 40:1 to about 25:1.

2. The composition according to claim 1,
    further comprising a stabilizing amount of an acidic stabilizer and a free radical inhibitor.

3. The composition according to claim 1,
    wherein the cyanoacrylate component is selected from materials within the structure $H_2C=C(CN)-\varphi OR$, wherein R is selected from $C_{1-15}$ alkyl, alkoxyalkyl, cycloalkyl, alkenyl, aralkyl, aryl, allyl and haloalkyl groups.

4. The composition according to claim 1, wherein the cyanoacrylate component comprises ethyl-2-cyanoacrylate.

5. The composition according to claim 1, further comprising an accelerator component selected from the group consisting of calixarene, oxacalixarene, silacrown, cyclodextrin, crown ether, poly (ethyleneglycol) di (meth) acrylate, ethoxylated hydric compound, and combinations thereof.

6. The composition according to claim 5, wherein the calixarene is tetrabutyl tetra [2-ethoxy-2-oxoethoxy] calix-4-arene.

7. The composition according to claim 5, wherein the crown ether is selected from members within the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1, 2-decalyl-15-crown-5, 1, 2-naphtho-15-crown-5, 3, 4, 5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1, 2-vinylbenzo-18-crown-6, 1, 2-t-butyl-cyclohexyl-18-crown-6, asym-dibenzo-22-crown-6, and 1, 2-benzo-1, 4-benzo-5-oxygen-20-crown-7 and combinations thereof.

8. The composition according to claim 5 wherein the poly (ethyleneglycol) di (meth) acrylate is within the following structure:

wherein n is greater than 3.

9. The composition according to claim 1, further comprising additives selected from the group consisting of shock resistant additives, thixotropy conferring agents, thickeners, dyes, thermal degradation resistance enhancers, and combinations thereof.

10. The composition according to claim 1, wherein the polyvinyl chloride/polyvinyl acetate co-polymer has a molecular weight of about 100,000 to about 140,000 Mw measured by size exclusion chromatography using THE as a solvent and polystyrene as a standard.

11. The composition according to claim 1, wherein the polyvinyl chloride/polyvinyl acetate co-polymer is present in an amount of about 15 percent by weight to about 20 percent by weight.

12. Reaction products of the composition according to claim 1.

13. The composition according to claim 1, having the following physical properties:
Stability ratio of initial viscosity at 23° C. vs. viscosity at 82° ° C. after 72 hours: less than about 2.0
Coat weight on foil: about 10 to 15 gsm
T-Peel on PVC after 6 weeks at 70° C./98% humidity: >=1, 5 N/mm to substrate failure.

14. The composition according to claim 13, having further the following physical properties:
T-Peel test at 23° ° C. at 24 hours: >=3 N/mm or to substrate failure
T-Peel test at 23° C. at 72 hours: >=3 N/mm or to substrate failure
T-Peel after storage at −10° C.: >=3 N/mm
Long term PVC adhesion: T-peel test at 23°C after 42 days storage in a climate conditioning cabinet set at 70°C/95% R.H: >=1.5 N/mm.

15. The composition according to claim 1, provided that the composition does not contain citric acid and/or a crown ether.

16. The composition according to claim 1, provided that the composition does not contain citric acid in an amount of 0.005 percent by weight and/or a crown ether in an amount of 0.2 percent by weight.

17. A method of bonding together two substrates, comprising the steps of:
applying a cyanoacrylate-containing composition according to claim 1, to at least one of the substrates and
mating together the substrates for a time sufficient to permit the adhesive to fixture.

18. A method of preparing a cyanoacrylate-containing composition according to claim 1, comprising the steps of:
providing a cyanoacrylate component, and
combining therewith with mixing an anhydride component and a polyvinyl chloride/polyvinyl acetate co-polymer.

19. A method of bonding a decorative laminate to a surface of an architectural window, comprising the steps of:
providing an architectural window profile constructed from polyvinyl chloride, wherein the architectural window frame profile has a plurality of surfaces, many of which are visible to an observer of the window when installed, and wherein the plurality of surfaces visible to an observer when installed has disposed thereover a protective releasable film,
removing the protective releasable film(s) from the appropriate surfaces of the architectural window profile,
applying to the appropriate surfaces a cyanoacrylate composition of claim 1 comprising:
(a) a cyanoacrylate component,
(b) an anhydride component, and
(c) a polyvinyl chloride/polyvinyl acetate co-polymer, and
disposing over the composition-applied surface(s) a decorative strip of about the same dimension of the surface to which it is applied.

* * * * *